(12) United States Patent
Lin et al.

(10) Patent No.: US 11,990,845 B2
(45) Date of Patent: May 21, 2024

(54) SECONDARY CONTROLLER APPLIED TO A SECONDARY SIDE OF A POWER CONVERTER AND OPERATION METHOD THEREOF

(71) Applicant: Leadtrend Technology Corp., Hsinchu County (TW)

(72) Inventors: Chung-Wei Lin, Hsinchu County (TW); Hung-Ching Lee, Hsinchu County (TW); Hong-Wei Lin, Hsinchu County (TW); Tsung-Chien Wu, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 247 days.

(21) Appl. No.: 17/828,038

(22) Filed: May 31, 2022

(65) Prior Publication Data

US 2023/0231484 A1 Jul. 20, 2023

(30) Foreign Application Priority Data

Jan. 18, 2022 (TW) .................................. 111101957

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC ............. H02M 3/335; H02M 3/33507; H02M 3/33569; H02M 3/33576; H02M 3/33592; H02M 1/0025
See application file for complete search history.

(56) References Cited

U.S. PATENT DOCUMENTS

| | | | |
|---|---|---|---|
| 2015/0214851 A1* | 7/2015 | Lin .................... | H02M 3/33592 363/21.14 |
| 2023/0231483 A1* | 7/2023 | Virunjipuram Murugesan .......... | H02M 3/33592 363/21.14 |

* cited by examiner

*Primary Examiner* — Gary L Laxton
(74) *Attorney, Agent, or Firm* — Winston Hsu

(57) ABSTRACT

A secondary controller applied to a secondary side of a power converter includes a control signal generation circuit and a gate control signal generation circuit. The gate control signal generation circuit generates a gate control signal, and generates an injection signal according to the gate control signal. When a superposition voltage is less than a reference voltage, the control signal generation circuit generates a gate pulse control signal, wherein the gate pulse control signal corresponds to an output voltage of the power converter and the injection signal, the gate control signal generation circuit is further used for generating a gate pulse signal according to the gate pulse control signal, and the gate pulse signal is used for making a primary side of the power converter turned on.

17 Claims, 3 Drawing Sheets

SECONDARY CONTROLLER APPLIED TO A SECONDARY SIDE OF A POWER CONVERTER AND OPERATION METHOD THEREOF

BACKGROUND OF THE INVENTION

1. Field of the Invention

The present invention relates to a secondary controller applied to a secondary side of a power converter and an operational method thereof, and particularly to the secondary controller and the operational method thereof that can utilize a superposition voltage to make ripples of a feedback voltage of the secondary side of the power converter not appear in groups and the power converter also not have audio noise when a capacitor coupled to the secondary side of the power converter has low electrical series internal resistance.

2. Description of the Prior Art

In the prior art, when a grounded capacitor (e.g. solid-state capacitor) coupled to a secondary side of a power converter has a low electrical series internal resistance, a feedback voltage received by a secondary controller applied to the secondary side of the power converter will have smaller ripples, wherein the feedback voltage relates to an output voltage of the secondary side of the power converter. When the output voltage of the secondary side of the power converter is lower than a target voltage, the secondary controller applied to the secondary side of the power converter will make a primary controller applied to a primary side of the power converter to turn on a power switch of the primary side of the power converter according to the feedback voltage, resulting in energy of the primary side of the power converter being transferred to the secondary side of the power converter to increase the output voltage. However, an operational frequency of the power switch may be increased rapidly in a short time because the feedback voltage has smaller ripples, resulting in the ripples of the feedback voltage appearing in groups and the power converter having audio noise. Therefore, how to solve the above-mentioned disadvantages of the prior art has become an important issue of a designer of the secondary controller.

SUMMARY OF THE INVENTION

An embodiment of the present invention provides a secondary controller applied to a secondary side of a power converter. The secondary controller includes a control signal generation circuit and a gate control signal generation circuit. The gate control signal generation circuit is used for generating a gate control signal, and generating an injection signal according to the gate control signal. The control signal generation circuit is coupled to an output terminal of the secondary side of the power converter and the gate control signal generation circuit, wherein when a superposition voltage is less than a reference voltage, the control signal generation circuit generates a gate pulse control signal, wherein the superposition voltage corresponds to an output voltage of the power converter and the injection signal, the gate control signal generation circuit is further used for generating a gate pulse signal according to the gate pulse control signal, and the gate pulse signal is used for making a primary side of the power converter turned on.

Another embodiment of the present invention provides an operational method of a secondary controller applied to a secondary side of a power converter, wherein the secondary controller includes a control signal generation circuit and a gate control signal generation circuit. The operational method includes the gate control signal generation circuit generating a gate control signal, and generating an injection signal according to the gate control signal; the control signal generation circuit generating a superposition voltage according to an output voltage of the power converter and the injection signal; when the superposition voltage is greater than a reference voltage, the control signal generation circuit generating a short-circuited control signal to a short winding switch after the gate control signal to make the short winding switch turned on according to the short-circuited control signal; when the superposition voltage is less than the reference voltage, the control signal generation circuit generating a gate pulse control signal; and the gate control signal generation circuit generating a gate pulse signal according to the gate pulse control signal, wherein the gate pulse signal is used for making a primary side of the power converter turned on.

The present invention provides a secondary controller applied to a secondary side of a power converter and an operational method thereof. The secondary controller and the operational method utilize a superposition voltage (corresponding to a feedback voltage of the secondary side of the power converter and greater than ripples of the feedback voltage) to make a primary controller of a primary side of the power converter control turning-on of the primary side of the power converter, so when an output voltage of the secondary side of the power converter is lower than a target voltage, an operational frequency of a power switch of the primary side of the power converter will be not increased rapidly in a short time because the superposition voltage is greater than the ripples of the feedback voltage. Therefore, compared to the prior art, because the secondary controller provided by the present invention utilizes the superposition voltage to make the primary controller control turning-on of the primary side of the power converter, rather than directly utilizing the feedback voltage to make the primary controller control turning-on of the primary side of the power converter, when the output voltage of the secondary side of the power converter is lower than the target voltage, the ripples of the feedback voltage do not appear in groups and the power converter does also not have audio noise.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
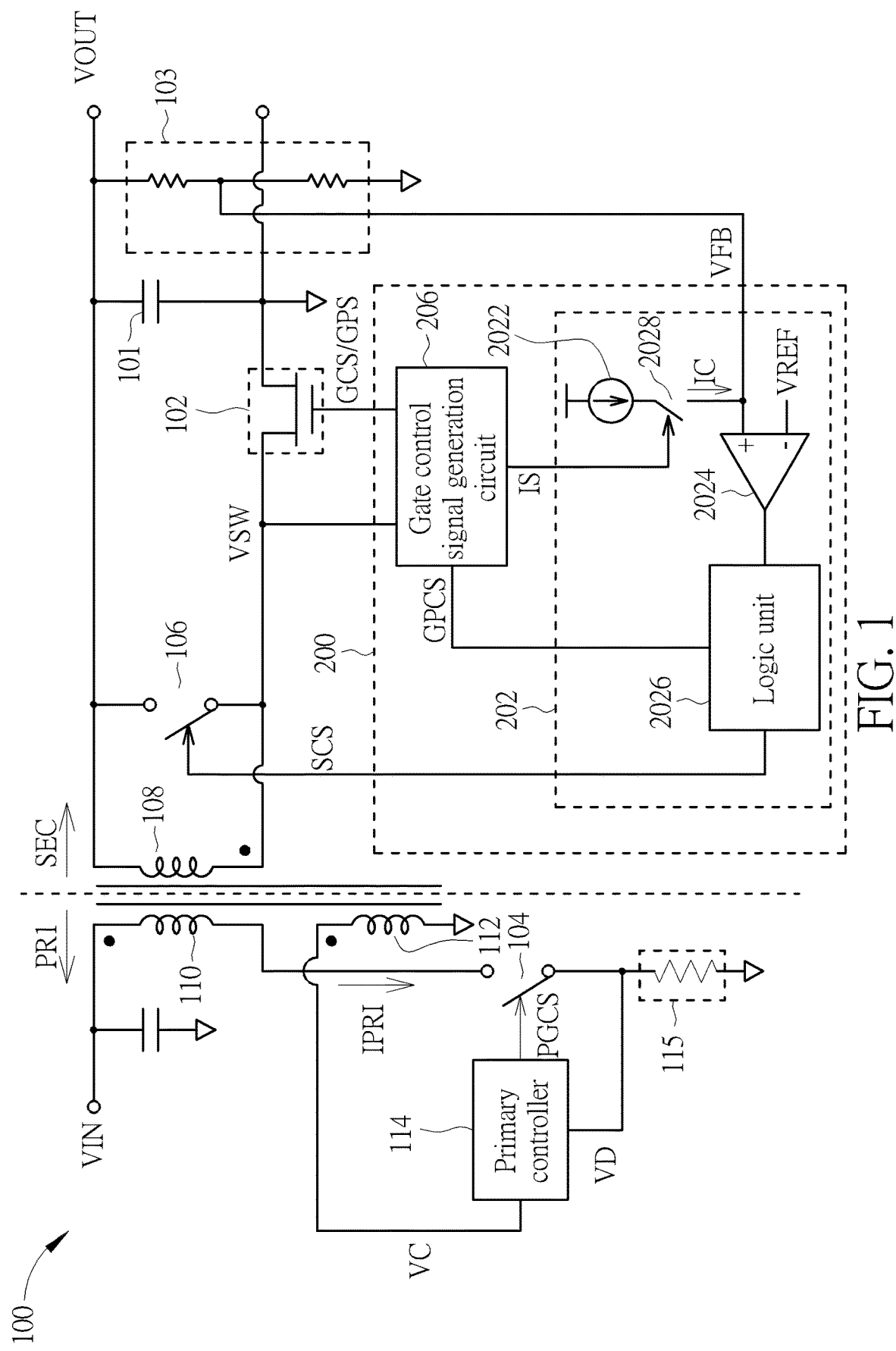
FIG. 1 is a diagram illustrating a secondary controller applied to a secondary side of a power converter according to a first embodiment of the present invention.

Please refer to FIG. 1. FIG. 1 is a diagram illustrating a secondary controller 200 applied to a secondary side SEC of a power converter 100 according to a first embodiment of the present invention, wherein the secondary controller 200 is located at the secondary side SEC of the power converter 100, a capacitor 101 coupled to the secondary side SEC of the power converter 100 has a low electrical series internal resistance, the power converter 100 is a flyback power converter, the secondary controller 200 includes a control signal generation circuit 202 and a gate control signal generation circuit 206, and the control signal generation circuit 202 is coupled to an output terminal of the secondary side SEC of the power converter 100 and the gate control signal generation circuit 206. In addition, potential of ground of a primary side PRI of the power converter 100 is equal to or different from potential of ground of the secondary side SEC of the power converter 100, and as shown in FIG. 1, an input voltage VIN of the primary side PRI of the power converter 100 is generated by an alternating voltage being rectified by a bridge rectifier.

As shown in FIG. 1, the control signal generation circuit 202 includes a current source 2022, a comparator 2024, and a logic unit 2026. a first input terminal of the comparator 2024 is used for receiving a feedback voltage VFB, wherein the feedback voltage VFB is generated by an output voltage VOUT of the secondary side SEC of the power converter 100 being divided by a voltage dividing circuit 103, and a second input terminal of the comparator 2024 is used for receiving a reference voltage VREF. In addition, the output voltage VOUT has lower ripples due to the capacitor 101 having the low electrical series internal resistance, resulting in the feedback voltage VFB also having lower ripples (as shown in a circle A of FIG. 2). In addition, as shown in FIG. 1, the gate control signal generation circuit 206 can generate an injection signal IS to a switch 2028 included in the control signal generation circuit 202 according to a gate control signal GCS generated by thereof. Therefore, when the switch 2028 is turned on, an injection current IC provided by the current source 2022 can charge the first input terminal of the comparator 2024, resulting in a superposition voltage SV being generated on the first input terminal of the comparator 2024, wherein because the superposition voltage SV is determined by the feedback voltage VFB and a width of the injection signal IS, the superposition voltage SV is equal to a sum of the feedback voltage VFB and a voltage corresponding to the width of the injection signal IS. That is to say, the superposition voltage SV is greater than the ripples of the feedback voltage VFB. In addition, because the feedback voltage VFB is generated through the output voltage VOUT and the voltage dividing circuit 103, the superposition voltage SV also corresponds to the ripples of the output voltage VOUT. In addition, in one embodiment of the present invention, the width of the injection signal IS is in a predetermined proportion to a discharge time of the secondary side SEC of the power converter 100. In addition, the gate control signal generation circuit 206 can generate the gate control signal GCS according to a secondary-side voltage VSW, wherein during enabling time of the gate control signal GCS, the synchronous switch 102 can be turned on according to the gate control signal GCS, and the enabling time of the gate control signal GCS corresponds to the discharge time of the secondary side SEC of the power converter 100. In addition, the present invention is not limited to inputting the injection current IC into the first input terminal of the comparator 2024 to generate the superposition voltage SV. That is to say, any configuration which can add a voltage to the feedback voltage VFB to generate the superposition voltage SV during the enabling time of the gate control signal GCS falls within the scope of the present invention.

Figure 2:
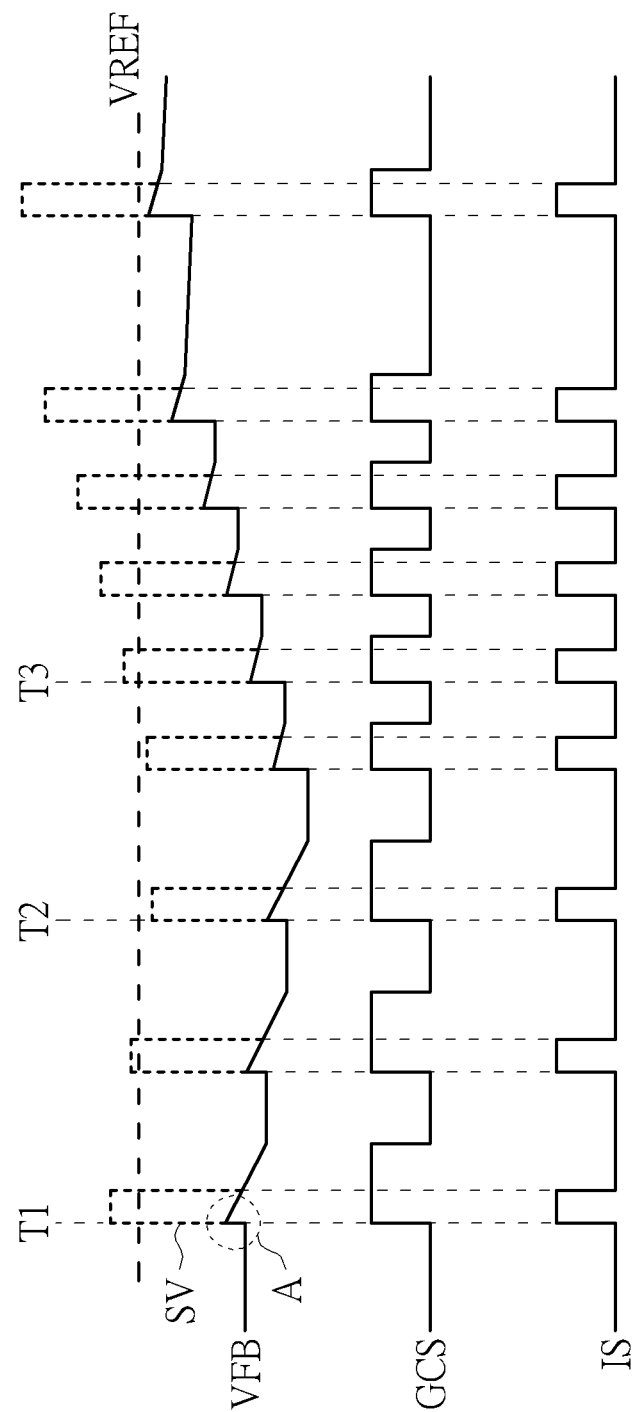
FIG. 2 is a diagram illustrating the feedback voltage, the reference voltage, the gate control signal, the injection signal, and the superposition voltage.

As shown in FIG. 2, at a time T1, the feedback voltage VFB starts to be reduced, resulting in the superposition voltage SV also starting to be reduced. As shown in FIG. 2, at a time T2, the superposition voltage SV starts to be less than the reference voltage VREF. Meanwhile, as shown in FIG. 1, the comparator 2024 can make the logic unit 2026 disable a short-circuited control signal SCS and make the logic unit 2026 generate a gate pulse control signal GPCS to the gate control signal generation circuit 206 after the gate control signal GCS, wherein because that the superposition voltage SV is less than the reference voltage VREF means that the feedback voltage VFB is lower (i.e. the output voltage VOUT is lower), a frequency of the logic unit 2026 generating the gate pulse control signal GPCS will be increased. In addition, operational principles of the short-circuited control signal SCS and the short winding switch 106 receiving the short-circuited control signal SCS can be referred to the contents corresponding to the short-circuited control signal SCS and the short winding switch 106 disclosed in U.S. Pat. No. 10,756,639B2, so further description thereof is omitted for simplicity. In addition, as shown in FIG. 1, the short winding switch 106 is coupled to the secondary-side winding 108 of the power converter 100, a predetermined time exists between the gate control signal GCS and the short-circuited control signal SCS, and the predetermined time is changed with a requirement of a designer of the power converter 100. Therefore, the gate control signal generation circuit 206 can generate a gate pulse signal GPS according to the gate pulse control signal GPCS, and the gate pulse signal GPS is used for making the primary side PRI of the power converter 100 turned on, wherein the primary side PRI of the power converter 100 and the secondary side SEC of the power converter 100 are not simultaneously turned on. In addition, an operational principle of the gate pulse signal GPS making the primary side PRI of the power converter 100 turned on can also be referred to the contents corresponding to the gate pulse control signal GPCS and the gate pulse signal GPS (e.g. the synchronous switch 102 of the secondary side SEC of the power converter 100 can be turned on according to the gate pulse signal GPS, and during the enabling time of the gate pulse signal GPS, variety of the secondary-side voltage VSW due to turning-on of the synchronous switch 102 is coupled to the primary side PRI of the power converter 100 through the primary-side auxiliary winding 112 and the secondary-side winding 108 of the power converter 100, wherein an operational principle of the primary controller 114 generating the primary-side gate control signal PGCS to the power switch 104 according to the variety of the secondary-side voltage VSW to make the primary side PRI of the power converter 100 turned on can also be referred to the corresponding contents disclosed in U.S. Pat. No. 10,756,639B2), so further description thereof is omitted for simplicity.

In addition, as shown in FIG. 2, at a time T3, the superposition voltage SV is greater than the reference voltage VREF. Meanwhile, as shown in FIG. 1, the comparator 2024 can make the logic unit 2026 disable the gate pulse control signal GPCS and the logic unit 2026 enable the short-circuited control signal SCS to the short winding switch 106 to make the short winding switch 106 turned on according to the short-circuited control signal SCS, wherein because that the superposition voltage SV is greater than the reference voltage VREF means that the feedback voltage VFB is higher (i.e. the output voltage VOUT is higher), the frequency of the logic unit 2026 generating the gate pulse control signal GPCS will be reduced. Therefore, because the secondary controller 200 utilizes the superposition voltage SV (corresponding to the feedback voltage VFB and greater than the ripples of the feedback voltage VFB) to make the primary controller 114 control turning-on of the primary side PRI of the power converter 100, when the output voltage VOUT is lower than a target voltage (wherein the target voltage corresponds to the reference voltage VREF), an operational frequency of the power switch 104 of the primary side PRI of the power converter 100 will be not increased rapidly in a short time because the superposition voltage SV is greater than the ripples of the feedback voltage VFB. Thus, the ripples of the feedback voltage VFB do not appear in groups and the power converter 100 does also not have audio noise. In addition, after the short winding switch 106 is turned on according to the short-circuited control signal SCS, the secondary-side voltage VSW will not have resonance to ensure that the primary side PRI of the power converter 100 is turned off.

In addition, as shown in FIG. 1, descriptions of the primary-side winding 110, the secondary-side winding 108, the voltage VC, the detection voltage VD, the primary-side current IPRI, and the resistor 115 can also be referred to the corresponding contents of the primary-side winding 110, the secondary-side winding 108, the voltage VC, the detection voltage VD, the primary-side current IPRI, and the resistor 115 disclosed in U.S. Pat. No. 10,756,639B2, so further description thereof is omitted for simplicity.

Figure 3:
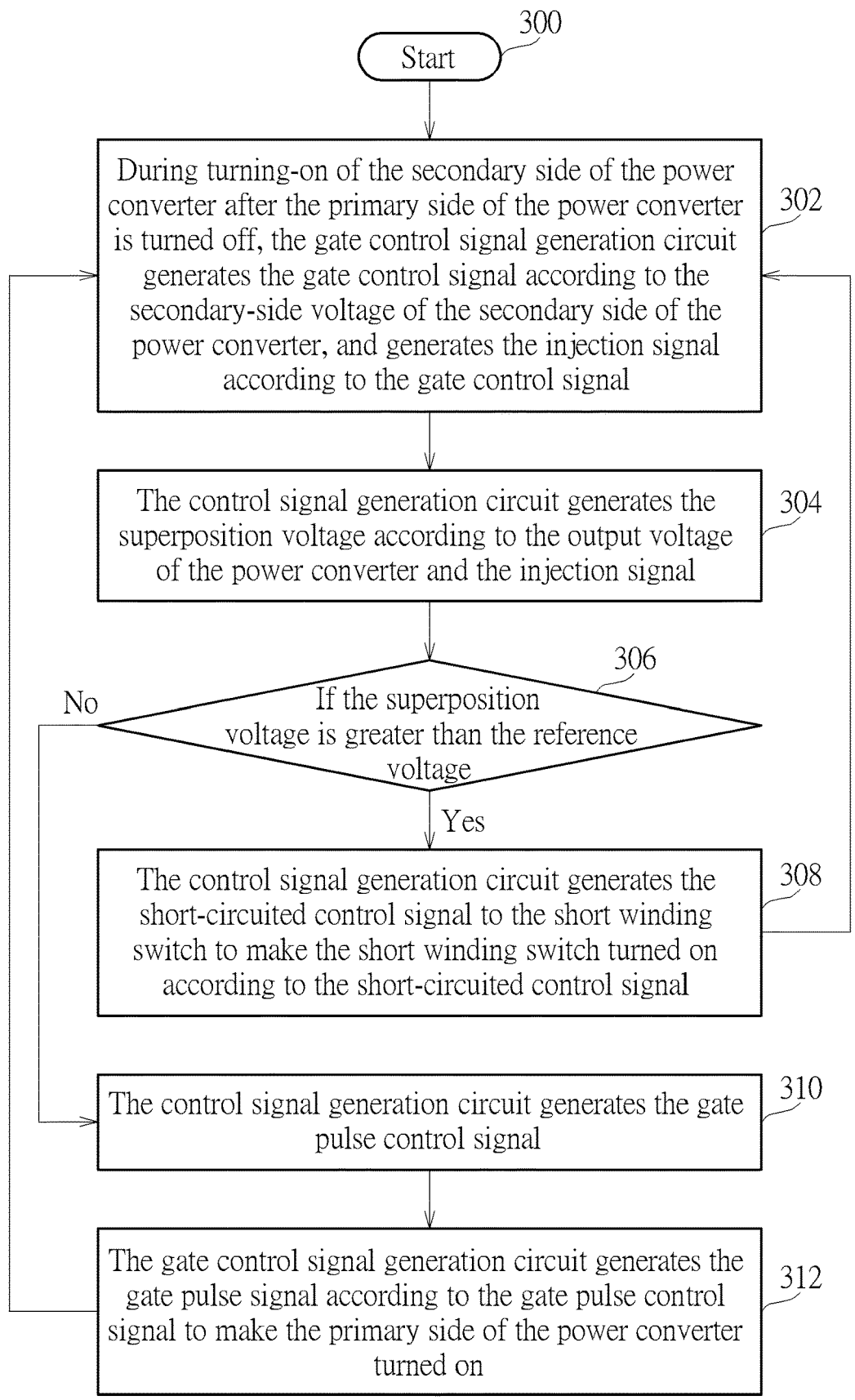
FIG. 3 is a flowchart illustrating an operational method of a secondary controller applied to a secondary side of a power converter according to a second embodiment of the present invention.

Please refer to FIGS. 1-3. FIG. 3 is a flowchart illustrating an operational method of a secondary controller applied to a secondary side of a power converter according to a second embodiment of the present invention. The operational method in FIG. 3 is illustrated using the power converter 100, the secondary controller 200, and the primary controller 114 in FIG. 1. Detailed steps are as follows:

Step 300: Start.

Step 302: During turning-on of the secondary side SEC of the power converter 100 after the primary side PRI of the power converter 100 is turned off, the gate control signal generation circuit 206 generates the gate control signal GCS according to the secondary-side voltage VSW of the secondary side SEC of the power converter 100, and generates the injection signal IS according to the gate control signal GCS.

Step 304: The control signal generation circuit 202 generates the superposition voltage SV according to the output voltage VOUT of the power converter 100 and the injection signal IS.

Step 306: If the superposition voltage SV is greater than the reference voltage VREF; if yes, go to Step 308; if no, go to Step 310.

Step 308: The control signal generation circuit 202 generates the short-circuited control signal SCS to the short winding switch 106 to make the short winding switch 106 turned on according to the short-circuited control signal SCS, go to Step 302.

Step 310: The control signal generation circuit 202 generates the gate pulse control signal GPCS.

Step 312: The gate control signal generation circuit 206 generates the gate pulse signal GPS according to the gate pulse control signal GPCS to make the primary side PRI of the power converter 100 turned on, go to Step 302.

In Step 302, after the primary side PRI of the power converter 100 is turned on, the primary controller 114 can determine whether to turn off the primary side PRI of the power converter 100 according to the detection voltage VD, wherein the secondary-side voltage VSW of the secondary side SEC of the power converter 100 can be changed with turning-on of the primary side PRI of the power converter 100. During turning-on of the secondary side SEC of the power converter 100 after the primary side PRI of the power converter 100 is turned off, the gate control signal generation circuit 206 can generate the gate control signal GCS according to the secondary-side voltage VSW of the secondary side SEC of the power converter 100, and generate the injection signal IS to the switch 2028 included in the control signal generation circuit 202 according to the gate control signal GCS.

In Step 304, when the switch 2028 is turned on, the injection current IC provided by the current source 2022 can charge the first input terminal of the comparator 2024, resulting in the superposition voltage SV being generated on the first input terminal of the comparator 2024, wherein because the superposition voltage SV is determined by the feedback voltage VFB and the width of the injection signal IS, the superposition voltage SV is equal to the sum of the feedback voltage VFB and the voltage corresponding to the width of the injection signal IS. That is to say, the superposition voltage SV is greater than the ripples of the feedback voltage VFB. In addition, in one embodiment of the present invention, the width of the injection signal IS can be in a predetermined proportion to the discharge time of the secondary side SEC of the power converter 100.

In Step 308, as shown in FIG. 2, at the time T3, because the superposition voltage SV is greater than the reference voltage VREF, the control signal generation circuit 202 disables the gate pulse control signal GPCS at the time T3 and generates the short-circuited control signal SCS to the short winding switch 106 to make the short winding switch 106 turned on according to the short-circuited control signal SCS. In addition, the predetermined time exists between the gate control signal GCS and the short-circuited control signal SCS, and the predetermined time is changed with the requirement of the designer of the power converter 100. Therefore, as shown in FIG. 2, after the short winding switch 106 is turned on, the secondary-side voltage VSW will not have resonance to ensure that the primary side PRI of the power converter 100 is turned off. In addition, after the short winding switch 106 is turned on, when a load coupled to the secondary side SEC of the power converter 100 suddenly becomes heavy to make the output voltage VOUT of the power converter 100 reduced to result in the superposition voltage SV being less than the reference voltage VREF, the control signal generation circuit 202 will generate the gate pulse control signal GPCS to the gate control signal generation circuit 206. Then, the gate control signal generation circuit 206 will generate the gate pulse signal GPS according to the gate pulse control signal GPCS to make the primary side PRI of the power converter 100 turned on.

In Step 310, as shown in FIG. 2, at the time T1, the feedback voltage VFB starts to be reduced, resulting in the superposition voltage SV also starting to be reduced. As shown in FIG. 2, at the time T2, the superposition voltage SV starts to be less than the reference voltage VREF. Meanwhile, as shown in FIG. 1, the control signal generation circuit 202 can disable the short-circuited control signal SCS and generate the gate pulse control signal GPCS to the gate control signal generation circuit 206 after the gate control signal GCS, wherein because that the superposition voltage SV is less than the reference voltage VREF means that the feedback voltage VFB is lower (i.e. the output voltage VOUT is lower), the frequency of the logic unit

2026 generating the gate pulse control signal GPCS will be increased. Therefore, in Step 312, the gate control signal generation circuit 206 can generate the gate pulse signal GPS according to the gate pulse control signal GPCS, and the gate pulse signal GPS is used for making the primary side PRI of the power converter 100 turning on, wherein the primary side PRI of the power converter 100 and the secondary side SEC of the power converter 100 are not simultaneously turned on.

To sum up, the secondary controller applied to the secondary side of the power converter and the operational method thereof utilize the superposition voltage (corresponding to the feedback voltage and greater than the ripples of the feedback voltage) to make the primary controller control turning-on of the primary side of the power converter, so when the output voltage is lower than the target voltage (corresponding to the reference voltage), the operational frequency of the power switch of the primary side of the power converter will be not increased rapidly in a short time because the superposition voltage is greater than the ripples of the feedback voltage. Therefore, compared to the prior art, because the secondary controller provided by the present invention utilizes the superposition voltage to make the primary controller control turning-on of the primary side of the power converter, rather than directly utilizing the feedback voltage to make the primary controller control turning-on of the primary side of the power converter, when the output voltage of the secondary side of the power converter is lower than the target voltage, the ripples of the feedback voltage do not appear in groups and the power converter does also not have audio noise.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A secondary controller applied to a secondary side of a power converter, the secondary controller comprising:
   a gate control signal generation circuit for generating a gate control signal, and generating an injection signal according to the gate control signal; and
   a control signal generation circuit coupled to an output terminal of the secondary side of the power converter and the gate control signal generation circuit, wherein when a superposition voltage is less than a reference voltage, the control signal generation circuit generates a gate pulse control signal, wherein the superposition voltage corresponds to an output voltage of the power converter and the injection signal, the gate control signal generation circuit is further used for generating a gate pulse signal according to the gate pulse control signal, and the gate pulse signal is used for making a primary side of the power converter turned on.

2. The secondary controller of claim 1, wherein when the superposition voltage is greater than a reference voltage, the control signal generation circuit is further used for generating a short-circuited control signal to a short winding switch after the gate control signal to make the short winding switch turned on according to the short-circuited control signal.

3. The secondary controller of claim 2, wherein a predetermined time exists between the gate control signal and the short-circuited control signal.

4. The secondary controller of claim 2, wherein when the superposition voltage is less than the reference voltage, the control signal generation circuit is further used for disabling the short-circuited control signal.

5. The secondary controller of claim 1, wherein the power converter is a flyback power converter.

6. The secondary controller of claim 1, wherein during turning-on of the short winding switch, the primary side of the power converter is turned off.

7. The secondary controller of claim 1, wherein a synchronous switch of the secondary side of the power converter is turned on according to the gate pulse signal, and during enabling time of the gate pulse signal, variety of a secondary-side voltage of the secondary side of the power converter due to turning-on of the synchronous switch is coupled to the primary side of the power converter through a secondary-side winding and a primary-side auxiliary winding of the power converter to make the primary side of the power converter turned on.

8. The secondary controller of claim 1, wherein the gate control signal generation circuit further generates the gate control signal according to a secondary-side voltage of the secondary side of the power converter, and a synchronous switch of the secondary side of the power converter is turned on according to the gate control signal.

9. The secondary controller of claim 8, wherein when the synchronous switch is turned on according to the gate control signal, a width of the injection signal is in a predetermined proportion to a discharge time of the secondary side of the power converter.

10. The secondary controller of claim 1, wherein the short winding switch is coupled to a secondary-side winding of the power converter.

11. An operational method of a secondary controller applied to a secondary side of a power converter, wherein the secondary controller comprises a control signal generation circuit and a gate control signal generation circuit, the operational method comprising:
    the gate control signal generation circuit generating a gate control signal, and generating an injection signal according to the gate control signal;
    the control signal generation circuit generating a superposition voltage according to an output voltage of the power converter and the injection signal;
    when the superposition voltage is greater than a reference voltage, the control signal generation circuit generating a short-circuited control signal to a short winding switch after the gate control signal to make the short winding switch turned on according to the short-circuited control signal;
    when the superposition voltage is less than the reference voltage, the control signal generation circuit generating a gate pulse control signal; and
    the gate control signal generation circuit generating a gate pulse signal according to the gate pulse control signal, wherein the gate pulse signal is used for making a primary side of the power converter turned on.

12. The operational method of claim 11, wherein during turning-on of the short winding switch, the primary side of the power converter is turned off.

13. The operational method of claim 11, wherein the gate pulse signal being used for making the primary side of the power converter turned on comprises:
    a synchronous switch of the secondary side of the power converter being turned on according to the gate pulse signal; and
    during enabling time of the gate pulse signal, variety of a secondary-side voltage of the secondary side of the power converter due to turning-on of the synchronous switch being coupled to the primary side of the power converter through a secondary-side winding and a primary-side auxiliary winding of the power converter to make the primary side of the power converter turned on.

14. The operational method of claim 11, wherein a predetermined time exists between the gate control signal and the short-circuited control signal.

15. The operational method of claim 11, wherein when the superposition voltage is less than the reference voltage, the control signal generation circuit is further used for disabling the short-circuited control signal.

16. The operational method of claim 11, wherein during turning-on of the secondary side of the power converter, the gate control signal generation circuit further generates the gate control signal according to a secondary-side voltage of the secondary side of the power converter, and a synchronous switch of the secondary side of the power converter is turned on according to the gate control signal.

17. The operational method of claim 16, wherein when the synchronous switch is turned on according to the gate control signal, a width of the injection signal is in a predetermined proportion to a discharge time of the secondary side of the power converter.

* * * * *